United States Patent [19]

Jourquin et al.

[11] 4,150,206

[45] Apr. 17, 1979

[54] PROCESS FOR PREPARING POLYURETHANE WITH INTEGRAL SKIN

[75] Inventors: Lucien Jourquin, Wetteren; Eddie Du Prez, St-Maria-Oudenhove, both of Belgium

[73] Assignee: s.a. PRB, Brussels, Belgium

[21] Appl. No.: 776,700

[22] Filed: Mar. 11, 1977

[30] Foreign Application Priority Data

Mar. 12, 1976 [LU] Luxembourg .............................. 74540

[51] Int. Cl.$^2$ ..................... C08G 18/14; C08G 18/18; C08G 18/22; C08G 18/26

[52] U.S. Cl. ...................................... 521/51; 521/121; 521/124; 521/125; 521/128; 521/129; 260/18 TN

[58] Field of Search .................. 260/2.5 AB, 2.5 AC, 260/2.5 AZ; 521/51

[56] References Cited

U.S. PATENT DOCUMENTS

| | | | |
|---|---|---|---|
| 3,422,036 | 1/1969 | Ellegast et al. | 260/2.5 AB |
| 3,476,933 | 11/1969 | Mendelsohn | 260/2.5 AC |
| 3,645,924 | 2/1972 | Fogiel | 250/2.5 AC |
| 3,655,597 | 4/1972 | Strassel | 260/2.5 AZ |
| 3,769,244 | 10/1973 | Hashimoto et al. | 260/77.5 AC |
| 3,814,707 | 6/1974 | Moeller et al. | 260/2.5 AK |
| 3,993,608 | 11/1976 | Wells | 260/2.5 AW |
| 4,006,124 | 1/1977 | Welte et al. | 260/2.5 AC |
| 4,025,466 | 5/1977 | Jourquin et al. | 260/2.5 AW |

FOREIGN PATENT DOCUMENTS

| | | | |
|---|---|---|---|
| 580788 | 8/1959 | Canada | 260/2.5 AB |
| 43-640 | 10/1968 | Japan | 260/2.5 AB |
| 68552 | 6/1975 | Luxembourg. | |
| 891007 | 3/1962 | United Kingdom | 260/2.5 AB |
| 900392 | 7/1962 | United Kingdom | 260/2.5 AB |
| 1009965 | 11/1965 | United Kingdom | 260/2.5 AB |

*Primary Examiner*—H. S. Cookeram
*Attorney, Agent, or Firm*—Sughrue, Rothwell, Mion, Zinn and Macpeak

[57] ABSTRACT

A process for preparing polyurethane with integral skin, wherein a composition comprising following ingredients: polyol, polyisocyanate, at most one part by weight of water to 100 parts by weight of polyol and catalyst, is reacted in a mould so that a polyurethane is formed, characterized in that one uses a polyisocyanate the NCO groups of which are not directly bonded to an aromatic group and, as catalyst, at least one of the following four synergistic combinations:

(1) at least an amine containing the structure:

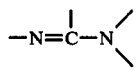

in association with at least an alkali metal or alkaline-earth metal salt, alcoholate and/or phenolate of an acid the dissociation constant of which Ka$\leq 10^{-1}$, preferably Ka$\leq 10^{-2}$;

(2) at least an organic lead compound in association with at least an organic initiator comprising at least one functional group of primary or secondary amine;

(3) at least an organic lead compound in association with at least an amine containing the structure:

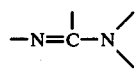

or, (4) at least an organic lead compound in association with at least an alkali or alkaline-earth metal salt, alcoholate and/or phenolate of an acid the dissociation constant of which Ka$\leq 10^{-1}$ preferably Ka$\leq 10^{-2}$.

28 Claims, No Drawings

PROCESS FOR PREPARING POLYURETHANE WITH INTEGRAL SKIN

This invention relates to a process for preparing polyurethane with integral skin, wherein a composition comprising following ingredient: polyol, polyisocyanate, at most one part by weight of water to 100 parts by weight of polyol and catalyst, is reacted in a mould so that a polyurethane be formed.

The technique for preparing integral skin polyurethane, the core of which is as a microcellular foam or as an elastomer, has been known for some time and allows to obtain either by casting into a mould, or by injection (RIM technique) into a mould, in one step, a polyurethane product having a skin which is either microcellular or non-cellular and which gives this product a beautiful finish. By means of this technique, various products such as wood, leather and the like can be imitated.

This technique finds its use in the furniture, automobile, electrotechnics and shoe industries for example.

The process for preparing integral skin polyurethane is a batchwise process so that in order that this process be profitable, times of moulding cycles must be relatively short and can only vary at most between 1 and 10 minutes.

For this reason, till now it has been usual to use aromatic isocyanates in the reaction composition.

However, it is known that polyurethane foams obtained from such polyisocyanates form by oxidation compounds with chromophore groups which are responsible for a yellowing effect. This oxidation is still accelerated under the influence of light.

Thus, till now, colour ranges which were possible to reach in products such as obtained according the process for preparing integral skin polyurethane were very limited or required an additional protective treatment on the polyurethane surface. It results therefrom for example that products provided for furniture and transport fields, such as saddles, bumpers instrument boards, cushions and the like are made with very deep colours or even with a black colour in order to hide the future yellowing.

In other respects, in other applications, wherein lighter colors are preferred, colored products are subjected to an additional treatment by means of lacquers, for example by immersion in a bath of a protection product. This additional treatment is difficult and expensive.

The object of this invention essentially lies in remedying these drawbacks while providing an industrially and economically very valuable process wherein an integral skin polyurethane is obtained, having a high stability against a discoloration due to the combined effect of oxidation and light so that products made of such a polyurethane can have an illimited number of colours without needing a further additional treatment for keeping the initial colour.

To this end, according to the invention, one uses a polyisocyanate the NCO groups of which are not directly bonded to an aromatic group and, as catalyst, at least one of the following four synergistic combinations:

(1) at least an amine containing the structure

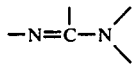

in association with at least an alkali metal or alkaline earth metal salt, alcoholate and/or phenolate of an acid the dissociation constant Ka of which $\leq 10^{-1}$, peferably $Ka \leq 10^{-2}$;

(2) at least an organic lead compound in association with at least an organic initiator comprising at least one functional group of primary or secondary amine;

(3) at least an organic lead compound in association with at least an amine containing the structure

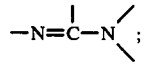

or (4) at least an organic lead compound in association with at least an alkali metal or alkaline earth metal salt, alcoholate and/or phenolate of an acid the dissociation constant of which $Ka \leq 10^{-1}$, preferably $Ka \leq 10^{-2}$.

The invention concerns as well products the core of which has a microcellular structure as products having a noncellular elastomer structure. This is also the case for the integral skin which may thus be as well microcellular as noncellular elastomer according to the applications.

Other details and features of the invention will become apparent from the description given hereinafter, by way of non limitative example, of some particular embodiments of the invention.

In general, the object of the invention aims at extending the molding technique of polyurethane, by casting or injection for example, to a polyurethane presenting a very high colour stability and having moreover physical or chemical characteristics which are at least comparable to those of conventional polyurethanes such as obtained by moulding.

It is known that yellowing of conventional polyurethanes is due to use of aromatic polyisocyanates which form by oxidation, degradation products havin chromophore groups.

A reactivity problem exists however if said polyisocyanates are substituted by aliphatic or alicyclic polyisocyanates.

Thus one of the essential objects of the invention is to provide catalysts allowing to obtain without needing an important modification of the conventional technology and under industrially and economically valuable conditions, a polyurethane meeting commercial requirements about colour stability.

Thus, according to the invention, it has been found that by a suitable combination of at least two kinds of compounds, some of which are already known as distinct catalysts or even as another possible ingredient in the polyurethane preparation, it is possible to gain unexpected results of reactivity with polyisocyanates the NCO groups of which are not directly bonded to an aromatic group, in the conventional processes for preparing polyurethane by moulding.

According to the invention, it has been found that the association of some of such compounds forms a really synergistic catalyst combination allowing to bring polyisocyanates the NCO groups of which are not directly bonded to an aromatic group up to the same level on reactivity point of view as polyisocyanates the NCO groups of which are directly bonded to an aromatic group and which are generally called aromatic polyisocyanates.

Being given that the essential effect which is sought is the colour stability of polyurethanes such as obtained, a preference is given to aliphatic and alicyclic polyisocyanates.

Suitable polyisocyanates for the present invention have for example been described in Luxemburg Pat. No. 68,552, French Pat. No. 2,077,383 and Canadian Pat. No. 918,675.

Such polyisocyanates are for example for the following: ethylene diisocyanate, propylene1.2diisocyanate, ethylidene diisocyanate, 2.2.4-trimethylhexamethylene diisocyanate, hexamethylene diisocyanate, cyclohexylene 1.2-diisocyanate, 3-isocyanatomethyl-3.5.5-trimethylcyclohexylisocyanate, m- and p-xylylene diisocyanate, 4.4'-methylene bis(cyclohexylisocyanate), 2.4'-(4.4')-methylene-bis(cyclohexyl-isocyanate), 2-methyl-1.3-cyclohexylene diisocyanate, bis(2-isocyanatoethyl)-carbonate, and the like.

It has been more particularly found that following isocyanates allow to obtain very valuable products: hexamethylene diisocyanate, 2.4.4-trimethylhexamethylene diisocyanate, 2.4'-(4.4')-methylene bis-(cyclohexylisocyanate) and 3-isocyanatomethyl-3.5.5-trimethyl-cyclohexylisocyanate.

It is also possible to provide use of prepolymers from said polyisocyanates as described for example in Canadian Pat. No. 822,188.

The content of NCO groups in the prepolymer is preferably about at least 10%, preferably, about at least 20%, the NCO index being able to vary between 70 and 140, preferably between 90 and 120.

Polyols which are used are usually those which are suitable in the conventional processes for preparing integral skin polyurethanes.

The kind of polyols used varies amongst others as a function of the desired final product.

In general, polyols can be of the polyester or polyether type.

Polyether polyols are formed by polyolyalkylene compounds having terminal OH groups, which are linear or ramified, obtained by polyaddition of polypropylene oxide and/or ethylene oxide on low molecular weight compounds comprising at least two hydroxy or amino groups as described for example in Canadian Pat. No. 918,675, U.S. Pat. No. 3,778,390 and German Pat. No. 2,354,952.

The most currently used polyether polyols for preparing flexible and/or semi-rigid integral skin foams are formed from slightly cross-linked polyoxyethylene-polyoxypropylene copolymers having 2 or 3 terminal OH groups per molecule, such as diols, and having a hydroxyl number of about 20 to 100, preferably 30 to 50, the content of active terminal primary hydroxy groups being generally of about at least 30%, preferably of about at least 50%. The most currently used polyethers in the preparation of rigid polyurethanes are ramified polyoxypropylene adducts having at least 3 terminal OH groups per molecule and a hydroxyl number of about 200 to 600.

Polyester polyols are esterification products having at least 2 terminal hydroxy groups obtained by condensation of polycarboxylic acids with excess of low molecular weight product having at least two functional (hydroxy or amino) groups, for example such as described in French Pat. No. 2,077,383, Canadian Pat. No. 918,675 and German Pat. 2,354,952 and also those such as obtained by open chain polymerization of caprolactone.

For preparation of flexible or semi-flexible integral skin polyurethanes, a preference is given to polyester polyols having a functionality of 2 or 3 and a hydroxyl number of about 20 to 100, more particularly of about 30 to 70, while, for preparing rigid integral skin polyurethanes, a preference is given to those presenting a functionality of at least 3 and a hydroxyl number between 200 and 600.

As already mentioned hereinbefore, the selection of the catalyst is of prime importance, according to this invention.

As a matter of fact, if in conventional systems for preparing integral skin polyurethanes, the aromatic polyisocyanate is replaced by a non-aromatic polyisocyanate, the problem of a low reactivity is raised, which does not allow to create the energetic reaction balance which is necessary to get, on the one hand, short enough moulding cycles and, on the other hand, a final product having valuable physical properties and a valuable commercial aspect.

Thus, according to the invention, as already described hereinbefore, selective catalysts have been proposed which allow to activate NCO groups of non-aromatic polyisocyanates in the manufacture of integral skin polyurethanes, namely according to a batchwise process of casting or injection in a mould, which is industrially and economically profitable, the cycle times of which are consequently relatively short and the final product of which meets the industrial requirements.

A specific characteristic of the process for preparing integral skin polyurethane foam is that the water content in the reaction composition is relatively low and is at most 1 part by weight of water to 100 parts by weight of polyol.

Consequently, when the catalysts are being selected, this limitation has to be taken into account.

It has been found that advantageously an association of at least an organic lead compound with either at least an initiator, or an amine of the structure

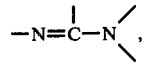

such as for example defined in the above-mentioned Luxemburg patent, or at least a salt, alcoholate and/or phenolate of an alkali metal or alkaline earth metal of an acid the dissociation constant $Ka \leq 10^{-1}$, preferably $Ka \leq 10^{-2}$, allows to form, owing to a synergistic effect, a catalyst which selectively promotes the reaction between NCO groups of the above-mentioned non-aromatic polyisocyanate and the OH groups of the polyol or optionally amine groups.

Moreover, it has been remarked that even in the presence of this very small water amount in the reaction composition, very good results are obtained by association of at least one of the amines having the structure

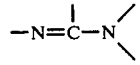

and of at least one of said salts, alcoholates and/or phenolates.

Owing to the very high synergistic effect such as obtained with this association, it has been found unexpectedly that the activity of NCO groups of non-aromatic polyisocyanates has substantially been brought up to the activity level of NCO groups of aromatic polyisocyanates. It follows therefrom tht the valuable processes for reaction compositions containing aromatic polyisocyanate are also suitable for reaction compositions containing non-aromatic polyisocyanates.

As it results from the preceding, four different synergistic combinations may be in fact provided as catalysts.

Furthermore, said combinations may form other more complex combinations provided that at least one said four basic combinations is present. For example, the catalyst can be formed of an organic lead compound, of an amine containing the structure

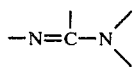

and of one of said salts, alcoholates and/or phenolates.

On the contrary, a combination of an amine containing the structure

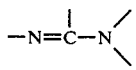

and of an initiator does not allow to get the necessary synergistic effect and consequently does not form a part of the present invention.

Also, an organic lead compound alone, or even in the presence of conventional tertiary amines and/or conventional catalysts such as tin dibutyldichlorate is not within the scope of the present invention for above-mentioned reasons.

However, one of the catalytic combinations according to the invention and such as hereinbefore defined can optionally be completed by conventional catalysts of tertiary amine and/or organo-metal type, which in some cases are very useful but generally are not essential.

Such tertiary amines are for example described in U.S. Pat. No. 3,799,898 and amongst these amines, triethylene diamine is the most usual.

Traditional organo-metal catalysts are described in general in the same U.S. patent. In general, their content is not higher than 0.5 part by weight to 100 parts by weight of polyol.

The most currently used catalysts are organic tin compounds, and particularly tin dibutyldilaurate, the content of which varies between 0.02 and 4 parts by weight with respect to 100 parts by weight of polyol. As organic lead compound, one preferably uses a compound selected from the group comprising:

(a) divalent lead organic salts of carboxyic acids containing at least a COOH group, (b) lead dithiocarbamates of the formula:

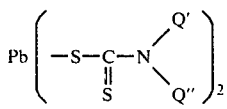

wherein Q' and Q" are identical or different and represent an alkyl ($C_1-C_{20}$) radical, (c) tetravalent organic lead compounds of the formula $PbQ_4''''$, wherein $Q''''$ is an alkyl ($C_1-C_6$) radical, and (d) divalent lead acetylacetonate.

More particularly, it has been found that amongst said organic lead compounds, the following ones are revealed as very efficient:

(a) divalent lead organic salts of carboxylic acids selected from the group comprised of lead acetate, adipate, citrate, 2-ethylhexoate, laurate, linoleate, naphthenate octanoate, oleate, oxalate, palmitate, resinate, ricinoleate, salicylate, stearate, tallate and tartarate, (b) dithiocarbamate of above-mentioned formula, wherein Q' and Q" are a ethyl, butyl or amyl radical, and (c) organic compounds of the formula $PbQ_4'''$, in which Q''' is a methyl or ethyl radical.

The term initiator means according to the invention the organic products containing at least a functional group constituted by primary or secondary amine. Moreover, the initiator can comprise in its molecula a combination of NH and $NH_2$ group, and also of hydroxy groups.

In general, the initiators have at least one of the three following functions: quick starting of the reaction, opening of the cells at the end of the reaction and extension or cross-linking of the chains.

An initiator which meets said three functions together is preferably used.

Quick starting of the reaction allows the creaming and rise time to be reduced due to an important heat evolution at the beginning of the isothermal reaction with isocyanate.

To obtain a sufficient opening of the cells at the end of the reaction is important to prevent the shrinkage problems.

Finally, in order that the initiator is also able to act as cross-linking agent or chain extender agent, it must comprise at least two functional groups for the isocyanate which is present. Initiators meeting said last condition also allow to accelerate the gel time and have a direct influence on the physical properties of the final product, such as mechanical properties, toughness and the like. It results therefrom that a preference is given to initiators comprising at least two functional groups in the molecule.

Hereinafter some specific examples of initiators are given, which are grouped according to the nature and the number of funtional groups comprised therein: (1) initiator with only one $NH_2$ group as functional group: ethylamine, butylamine, hexylamine, laurylamine, octylamine, propylamine, pentylamine, heptylamine, nonylamine, decylamine, undecylamine, heptadecylamine, oleylamine, benzylamine, allylamine, N-2-aminoethylmorpholine, cyclohexylamine, 2(3,4)-chlorbenzylamine, 1,3-dimethylbutylamine, 2,5-dimethylbenzylamine, o(m,p)-methoxybenzylamine, 3N-dimethyl-(diethyl)amino-1,3-propanediamine, 2-amino -5N-diethylaminopentane, N(3-aminopropyl)-2-pyrrolidone, N-3-aminopropylmorpholine; (2) initiators having only one NH group as functional group: diethylamine, di(iso)propylamine, dibutylamine, dioctylamine, dihexylamine, dinonylamine, dicyclohexylamine, N-mthyloctadecylamine, N-ethyl- and N-propylbenzylamine, pyrazole, pyrrole, pyrrolidine, piperidine, morpholine, 2-(2-hydroxyethyl)-piperidine, bis(2-chloroethyl)amine, N,N-bis(2,2-diethoxyethyl)amine; (3) initiators having two $NH_2$ groups as functional groups: 1,2-diaminopropane, 1,3-diaminopropane, ethylene diamine, 1,4-diaminobutane, 1,5-diaminopentane, 1,6-diaminohexane, 1,10-diaminodecane, 1,12-diaminododecane, isophorondiamine, 2,2,4-trimethyl-hexamethylene-diamine, "Jeffamines D 230 , D 400, D 100" (which are commercial products of the firm Jefferson) 1,4-bis(3-aminopropyl)piperazine; (4) initiators having two NH groups as functional groups: N,N'-dimethyl-(diethyl)-ethylenediamine and 4,4'-trimethylene-dipiperidine; (5) initiators containing at least a NH2 group and at least a NH group as functional groups: 3-ethylamino-1-propylamine, 3 butylamino-1-propylamine, 3-propylamino-1-propylamine, "Dinorams et Trinorams" (commercial products of the firm Pierrefitte - Auby France), diethylenetriamine, triethylenetriamine, tetraethylenepentamine, pentaethylenehexamine, N-isopropyl-2-methyl-1,2-propanediamine, N-(2-aminoethyl)-piperazine, 1-(β-aminoethyl)-2-imidazolidone, 3,3'-imino-bispropylamine, bis(2-aminopropyl)-amine, bishexamethylene triamine; (6) initiators comprising at least one NH groups and/or NH2 group and also at least one or more hydroxy groups: monoethanolamine, isopropanolamine, 3-amino-1-propanol, 3-amino-1,2-propanediol,2-amino-2-methyl-1-propanol, 2-amino-2-methyl-1,3-propanediol, 2-amino-1-butanol, 6-amino-1-hexanol, 1,3-diamino-2-propanol, diethanolamine, diisopropanolamine, 2-(2,2-aminoethylamino)ethylamino-ethanol, N-aminoethylethanolamine, N,N'bis(2-hydroxyethyl)-1,2-diainocyclohexane, N,N'-hydroxyethyl-ethylenediamine, N(3-aminopropyl)-diethanolamine, tris(hydroxymethyl)-aminoethane and 2-(2-methanolamino)-ethylamino-ethanol.

Amongst amines of structure

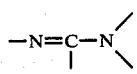

which form part of the synergistic combination according to the invention, the following compounds may be cited:

(1) diazabicycloalkenes of the formula:

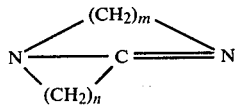

(I)

wherein m varies from 3 to 7 and n from 2 to 4, and their salts of organic acids the dissociation constant Ka $\leq 10^{-2}$, (2) substituted guanidines and salts thereof of the formula:

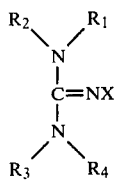

(II)

wherein $R_1$, $R_2$, $R_3$ and $R_4$ independently represent an alkyl ($C_1$-$C_4$) radical, an alkyl ($C_1$-$C_4$) radical substituted by an alkoxy ($C_1$-$C_4$)radical, or a heterocyclic radical ($C_5$-$C_7$) containing at most two atoms selected from the group comprising sulfur and oxygen, $R_1$-$R_2$ and/or $R_3$-$R_4$ being able to form with adjacent nitrogen atom, a heterocyclic ($C_5$-$C_7$) ring containing at most a sulfur or oxygen atom, X represents hydrogen, a phenyl group, a phenyl group substituted by one or more alkoxy ($C_1$-$C_4$) radicals, alkyl ($C_1$-$C_4$) radicals or halogens, or represents a radical of the formula:

(III)

wherein $R_5$, $R_6$ and $R_7$ independently represent hydrogen, an alkyl ($C_1$-$C_4$) radical or an alkyl ($C_1$-$C_4$) radical substituted by phenyl, substituted phenyl, alkoxy ($C_1$-$C_4$), aryloxy ($C_6$-$C_{15}$), nitrile, carbalkoxy, $R_7$ may represent an alkyl ($C_5$-$C_{18}$) radical, a substituted phenyl radical or an alkoxy ($C_1$-$C_4$) radical, or one or both of the groups $R_5$-$R_6$, $R_5$-$R_7$ and $R_6$-$R_7$ forma cyclic ring of carbon atoms with at most a nitrogen, sulfur or oxygen atom, X may be a radical of the formula:

(IV)

wherein z is a integer varying from 2 to 12, R' and R" representing hdyrogen or an alkyl ($C_1$-$C_4$) radical, R''' and R'''' represent an alkyl ($C_1$-$C_4$) radical or form with nitrogen a cycloalkyl ($C_5$-$C_6$) radical, as well as addition salts of said guanidines and salts of guanidines wherein at least one of $R_1$, $R_2$, $R_3$ or $R_4$ is hydrogen, with an acid having a dissociation constant Ka $\leq 10^{-3}$;

(3) substituted biguanidines of the formula:

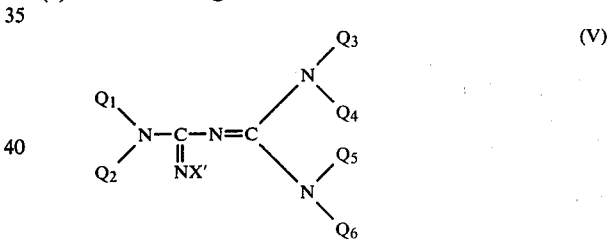

(V)

wherein $Q_1$ to $Q_6$ independently represent an alkyl ($C_1$-$C_4$) radical or an cycloalkyl ($C_3$-$C_4$) radical, and X' is hydrogen or a carbamoyl radical of the formula:

(VI)

wherein Z is a monovalent radical remaining after eliminination of anisocyanate group of the above-mentioned polyisocyanate, $Q_1$ to $Q_6$, X' and Z may optionally be substituted by chlorine, bromine or alkoxy ($C_1$ to $C_2$);

(4) substituted biguanidines of the formula:

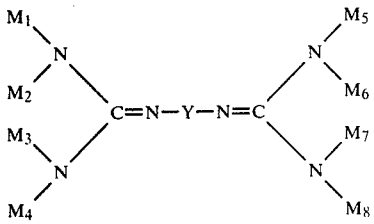

wherein $M_1$ to $M_8$ independently represent an alkyl ($C_1$–$C_4$) radical, Y is a group:

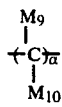
(VIII)

wherein $M_9$ and $M_{10}$ represent hydrogen or an alkyl ($C_1$–$C_4$) radical, and $\alpha$ is an integer varying from 3 to 12, or represents a divalent cyclohexyl radical or a divalent isophorone radical (isophorone is the 3.3.5-trimethylcyclohexanone-3-carboxylic radical).

A preference is given to amines of the structure

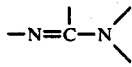

selected from the group comprising:
(1) following diazobicycloalkenes:
1.5-diazabicyclo (4.3,0)nonene -5,
1.8-diazabicyclo(5,4,0)undecene -7.
1.8-diazabicyclo(5,3,0)decene -7,
1.5-diazabicyclo(5,4,0)decene -5,
1.4-diazabicyclo(3,3,0)octene -4,
salts addition of said diazabicycloalkenes with mono- or dicarboxylic acids having a dissociation constant $Ka \leq 10^{-4}$, with carbonic acid and with phenols.
(2) substituted guanidines of the formula:

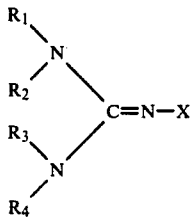
(II)

wherein X represents hydrogen, a methyl, cyclohexyl, decyl, dodecyl, akylphenyl ($C_1$–$C_4$) radical or a radical of the formula:

—($CH_2$)$_z$ N(R'''R'''')

in which z is equal to 2 or 3, and R''' and R'''' are identical or different and represent an alkyl ($C_1$–$C_4$) radical, $R_1$ to $R_4$ being identical or different and represent a methyl radical or hydrogen, as well as salts of addition of said guanidines and salts of guanidines of the above formula, wherein moreover at least $R_1$ and $R_2$ are hydrogen, with carbonic acid and phenol,
(3) 1.1.4.4.5.5-hexamethylisobiguanidine, and
(4) substituted biguanidines of the formula:

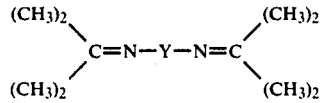

in which Y is a divalent alkylene ($C_6$–$C_{12}$) radical.

As salts, alcoholates and phenolates of alkali metals and alkaline-earth metals, the following ones are particularly preferred: salts of sodium and potassium of oleic, 2.3-methylbenzoic, adipic, 2.4-dichlorobenzoic, benzoic, β-chloroacetic, chloro- and bromobenzoic, salicylic, acetic, formic acid, and sodium and potassium phenolates and sodium and potassium methoxides.

If in the catalytic combination according to the invention, amines of the structure:

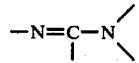

are used, their content is between 0.1 and 10 parts by weight, preferably 0.5 to 3 parts by weight to 100 parts by weight of polyol. If the catalytic combination contains one of said salts, alcohols or phenolates, its content is between 0.05 and 5 parts by weight, preferably 0.2 to 3 parts by weight to 100 parts by weight of polyol.

If it is a catalytic combination, based on an organic lead compound, its content is between 0.1 to 10 parts by weight, preferably 0.2 to 4 parts by weight or polyol.

A preference is generally given to divalent lead salts of carboxylic acids such as recited hereinbefore.

In the case of the catalytic combination should contain a monofunctional initiator, its content is generally between 0.2 and 5 parts by weight, preferably from 0.2 to 3 parts by weight to 100 parts by weight of polyol, while if it is an initiator which is at least difunctional, its content is generally, in the catalytic combination, 0.2 to 30 parts by weight, preferably 0.2 to 10 parts by weight to 100 parts by weight of polyol.

Furthermore, if the content of polyfunctional initiator is lower than 2 parts by weight with respect to 100 parts by weight of polyol, it is essential in order to obtain good reaction conditions, to incorporate in addition in the reaction composition, a cross-linking agent, which is generally constituted by a compound having a relatively low molecular weight and having at least two functional groups, in most cases hydroxy groups, which are reactive with respect to isocyanate groups.

Said cross-linking agents may also have as one of their effects, an extension of chains in the final product, and are moreover currently used in the conventional processes for preparing integral skin polyurethanes.

Typical examples of such cross-linking agents are: butanediol, ethylene glycol, diethylene glycol, triethanolamine, glycerine, trimethylolpropane, "Thanol C150" (commercial product of the firm Jefferson), polyol "Niax 327" (commercial product of the firm Union Carbide), hexanediol, propylene glycol, neopentyl glycol, dipropylene glycol, "quadrol" (commercial product of the firm Jefferson), "Niax Pentol La 700" (commercial product of the firm Union Carbide), and in fact polydiols of the polyether and polyester type having a hydroxyl number equal to or lower than 200. The contents of cross-linking agent may generally vary between 5 and 20 parts by weight to 100 parts by weight of polyol.

If the content of polyfunctional initiator is at least 2 parts by weight, preferably 4 parts by weight to 100 parts by weight of polyol, use of cross-linking agents is not absolutely essential but could however be useful according to the reaction scheme and the physical properties of desired final products.

It may be still mentioned that examples of such cross-linking agents (cross-linkers and/or chain extenders) are cited in U.S. Pat. No. 2,354,952 and in Canadian Pat. Nos. 822,188 and 918,675. Use of such a cross-linking agent is thus necessary if one uses as catalytic combination one of the hereinbefore described systems which do not contain any polyfunctional initiator in ratios higher than 2 parts by weight, to 100 parts by weight of polyol, already mentioned previously.

Swelling agents which can be used in the process according to the invention correspond to agents currently used in the conventional process for preparing integral skin polyurethane from aromatic polyisocyanate. As physical swelling agent, one preferably uses trichlorofluoromethane and methylene chloride or mixtures of both said substances, in a ratio of 2 to 30 parts by weight to 100 parts by weight of polyol. The content of chemical swelling agent, which is water substantially in most cases, is lower than or equal to 1 part by weight, preferably lower than or equal to 0.5 part by weight to 100 parts by weight or polyol.

Surface active agents are generally not used in the preparation of flexible or semi-flexible polyurethane having an integral skin but may be on the contrary useful in the preparation or rigid integral skin polyurethanes. In general, use of polydimethylsiloxane—polyoxyalkylene copolymers is provided. In some cases, active surface-active agents without silicone may be used.

Finally, the reaction composition may comprise pigments, antioxidants and the like as currently used in conventional polyurethane foams. Addition of antioxidants of the organic phosphite type and of UV absorbers allows to ensure an additional improvement when considering the resistance to yellowing and the degradation under the influence of oxygen and light.

Hereinafter in a series of tables, examples of preparation of specific polyurethanes with integral skin are grouped in order to more completely illustrate the process according to the invention.

| Example No. | | 1 | 2 | 3 | 4 | |
|---|---|---|---|---|---|---|
| (1) | Ingredient | | | | | |
| (a) | polyol | CP 4800 : 100 | idem | idem | idem | |
| (b) | isocyanate | TMDT : 30.5 | idem | idem | idem | |
| | NCO index | 100 | idem | idem | idem | |
| (c) | swelling | Water : 0.2 | idem | idem | idem | |
| | agent | MC : 12 | idem | idem | idem | |
| (d) | cross-linking agent | di EG : 8 quadrol : 4 | idem idem | idem idem | idem idem | |
| (e) | catalyst | PB acetate : 0.5 dibutylamine : 2 | DBU : 1 Na acetate : 1 | Pb octoate : 0.5 N-3-aminopropyl-morpholine : 2 DABCO : 0.3 | Pb dimethyl-dithiocarbamate : 1 K phenolate : 1 DBTL : 0.05 | |
| (f) | anti-oxidant | TPP : 3 TOP : 2 UV-absorbent : 0.3 | idem idem idem | idem idem idem | idem idem idem | |
| (2) | Reaction characteristics | | | | | |
| (a) | free RG | 86 | 81 | 90 | 82 | |
| (b) | CRT | 12 | 10 | 16 | 13 | |
| (c) | RT and TFT | 39 | 40 | 40 | 45 | |
| | Free 40% CLD | 98 | 92 | 105 | 90 | |
| (3) | Properties of the moulded product | | | | | |
| (a) | RG m. | 242 | 294 | 296 | 288 | |
| (b) | ER | 280 | 247 | 252 | 305 | |
| (c) | RR | 42 | 47 | 47 | 45 | |
| (d) | TR | 20 | 18 | 19 | 24 | |
| (e) | Xenon test | scale 7–8 | idem | idem | idem | |
| Example No. | | 5 | 6 | 7 | 8 | 9 |
| (1) | Ingredient | | | | | |
| (a) | polyol | idem | idem | idem | idem | idem |
| (b) | isocyanate | idem | idem | idem | idem | idem |
| | NCO index | idem | idem | idem | idem | idem |
| (c) | swelling | idem | idem | idem | idem | idem |
| | agent | idem | idem | idem | idem | idem |
| (d) | cross-linking agent | idem idem | idem idem | diEG : 8 — | diEG : 8 quadrol : | diEG : 8 quadrol : 4 |
| (e) | catalyst | Pb naphthenate : 1 pyrazole : 2 | Pb adipate : 2 TMG : 1.5 | Pb tetraetyle: 1 DEOA : 3 | DABCO : 0.5 DBTL : 0.3 N-3-amino-propylmor-pholine : 3 | DABCO : 0.5 DBTL : 0.3 TMG : 2 |
| (f) | antioxidant | idem | idem | idem | idem | idem |
| (2) | Reaction characteristics | | | | | |
| (a) | free RG | 86 | 84 | 93 | — | — |
| (b) | CRT | 9 | 10 | 10 | — | — |
| (c) | RT and TFT | 42 | 37 | 39 | — | — |
| | Free 40% CLD | 103 | 100 | 111 | — | — |
| (3) | Properties of the moulded product | | | | | |
| (a) | RG m. | 263 | 205 | 225 | — | — |
| (b) | ER | 284 | 268 | 275 | — | — |
| (c) | RR | 40 | 38 | 40 | — | — |
| (d) | TR | 19 | 21 | 21 | — | — |
| (e) | Xenon test | idem | idem | idem | idem | idem |

-continued

| Example No. | 10 | 11 | 12 | 13 |
|---|---|---|---|---|
| (1) Ingredient | | | | |
| (a) polyol | D 3900 : 100 | idem | idem | idem |
| (b) isocyanate | Hylene W : 47 | idem | idem | idem |
| NCO index | 105 | idem | idem | idem |
| (c) swelling agent | Water : 0.1 Freon : 7 | idem | idem | idem |
| (d) cross-linking agent | BD : 12 | idem | idem | BD : 6 |
| (e) catalyst | DBN : 1 K phenolate : 1 | Pb salicylate : 1 TMGC : 1.5 | Pb acetylacetonate : 1 Na benzoate : 2 | Pb linoleate : 0.5 Tris-hydroxymethylaminomethane : 4 |
| (f) antioxidant | PDDP : 3 TRIS : 2 UV absorbent : 0.2 | idem idem idem | idem idem idem | idem idem idem |
| (2) Reaction characteristics | | | | |
| (a) free RG | 174 | 186 | 172 | 173 |
| (b) CRT | 8 | 11 | 10 | 11 |
| (c) RT + TFT | 36 | 40 | 37 | 38 |
| (3) Properties of moulded product | | | | |
| (a) RG m | 566 | 586 | 612 | 655 |
| (b) ER | 483 | 506 | 494 | 452 |
| (c) RR | 48 | 52 | 52 | 59 |
| (d) TR | 40 | 37 | 43 | 49 |
| (i) Shore A | 65 | 65 | 70 | 68 |
| (e) Xenon test | Scale 7-8 | Scale 7-8 | Scale 7-8 | Scale 7-8 |

| Example No. | 14 | 15 | 16 | 17 | 18 |
|---|---|---|---|---|---|
| (1) Ingredient | | | | | |
| (a) polyol | Scuranol 4004 : 100 | idem | idem | Scuranol 3900 : 100 | Scuranol 4004 : 100 |
| (b) isocyanate | : 59 | idem | idem | 47 | 59 |
| NCO index | : 100 | idem | idem | 105 | 100 |
| (c) swelling agent | Water : 0.8 | idem | idem | Water : 0.1 Freon : 8 | water : 0.8 |
| (d) cross-linking agent | BD : 12 | idem | idem | idem | idem |
| (e) catalyst | Pb octancate : 1 1.3 propanediamine : 0.5 | Pb oxalate : 1 Diethylenetriamine : 1 | Pb acetate : 0.8 PMG : 1 | DABCO : 1 DBTL : 0.2 1.3-propanediamine : 2 | DABCO : 1 DBTL : 0.2 Na phenolate : 1 |
| (f) antioxidant | PDDP : 3 TRIS : 2 UV absorbent 0.2 | idem idem idem | idem idem idem | idem idem idem | idem idem idem |
| (2) Reaction characteristics | | | | | |
| (a) free RG | 187 | 189 | 195 | — | — |
| (b) CRT | 9 | 14 | 12 | — | — |
| (c) RT + TFT | 35 | 36 | 38 | — | — |
| (3) Properties of moulded product | | | | | |
| (a) RG m. | 589 | 552 | 510 | — | — |
| (b) ER | 590 | 557 | 555 | — | — |
| (c) RR | 92 | 90 | 83 | — | — |
| (d) TR | 48 | 55 | 46 | — | — |
| (i) Shore A | 74 | 70 | 73 | — | — |
| (e) Xenon test | Scale ≧ 8 | Scale ≧ 8 | Scale ≧ 8 | — | — |

| Example No. | 19 | 20 | 21 | 22 |
|---|---|---|---|---|
| (1) Ingredient | | | | |
| (a) polyol | Caradol 36-1 : 100 | idem | idem | idem |
| (b) isocyanate | IPDI : 59 | idem | idem | Prep.IPDI-DIPA (25%NCO):85 |
| NCO index | : 110 | idem | idem | 105 |
| (c) swelling agent | Water : 0.1 Freon : 3 | idem | idem | idem |
| (d) cross-linking agent | BD : 10 TEOA : 3 TMP : 2 EG : 2 | idem idem idem idem | idem idem EG : 2 | BD : 10 TEOA : 3 TMP : 2 EG : 2 |
| (g) surface-active agent | L5305 : 0.2 | idem | idem | idem |
| (e) catalyst | Pb 2-ethylhexoate : 1.5 Jeffamine D 230 : 1.5 DBTA : 0.05 | Pb acetate : 2 K oleate : 2 | Pb laurate : 1.2 N-3-aminopropyl-diethanolamine : 5 | Pb naphthenate : 1.5 guanidine phenolate : 1 |
| (f) antioxidant | TPP : 3 TOP : 2 UV absorbent : 0.3 | idem idem idem | idem idem idem | idem idem idem |
| (2) Reaction characteristics | | | | |
| (a) 185 free RG | 330 | 351 | 342 | 378 |
| (b) CRT | ± 6" | ± 6" | ± 6" | ± 6" |

| | | | | |
|---|---|---|---|---|
| (c) RT + TFT | ±10" | ±14" | ±15" | ±11" |
| (3) Properties of moulded product | | | | |
| (a) RG m | 915 | 992 | 886 | 915 |
| (b) ER | 435 | 470 | 404 | 431 |
| (c) RR | 143 | 165 | 150 | 186 |
| (i) Shore A | 81 | 88 | 81 | 87 |
| (e) Xenon test | Scale ≧ 8 | Scale ≧ 8 | Scale ≧ 8 | Scale ≧ 8 |

| Example No. | 23 | 24 | 25 | 26 |
|---|---|---|---|---|
| (1) Ingredient | | | | |
| (a) polyol | idem | idem | D 2100 : 70<br>F 50 : 30 | Caradol 36-1 : 110 |
| (b) isocyanate | IPDI : 59 | IPDI 59 | Prep.IPDIglycerin (NCO 30%) : 8 | IPDI : 59 |
| NCO index | 110 | 110 | | 110 |
| (c) swelling agent | idem<br>idem | idem<br>idem | Water : 0.25<br>Freon : .50 | Water : 0.1<br>Freon : 3 |
| (d) cross-linking agent | idem | idem | : 2 | EG 2<br>BD : 10 |
| (g) surface active agent | idem | idem | idem | idem |
| (e) catalyst | Pb tetraethyl : 1<br>Pb stearate : 1<br>TMCD : 0.8<br>monoethanolamine : 1 | Pb adipate : 2<br>Na salicylate : 1.5 | Pb diamyl-3-di-thiocarbamate : 1<br>DBU phenolate : 1 | DABCO : 1<br>DBTA : 0.1<br>N-3-aminopropyldiethanolamine : 5 |
| (f) antioxidant | idem | idem | idem | idem |
| (2) Reaction characteristics | | | | |
| (a) free RG | 364 | 327 | 357 | — |
| (b) CRT | ±6" | ±6" | ±6" | — |
| (c) RT + TFT | ±13" | ±10" | ±18" | — |
| (3) Properties of moulded product | | | | |
| (a) RG m | 960 | 974 | 907 | — |
| (b) ER | 455 | 476 | 482 | — |
| (c) RR | 155 | 126 | 163 | — |
| (i) Shore A | 87 | 85 | 88 | — |
| (e) Xenon test | idem | idem | Scale 8 | — |

| Example No. | 27 | 28 | 29 | 30 |
|---|---|---|---|---|
| (1) Ingredient | | | | |
| (a) + (d)Polyol + cross-linking agent | Z 800 : 70<br>F 50 : 25<br>glycerin : 5 | idem | idem | idem |
| (b) Isocyanate | Hylene W : 95 | idem | idem | idem |
| NCO index | 100 | idem | idem | idem |
| (c) Swelling agent | water : 0,1<br>MC : 10 | idem<br>idem | idem<br>idem | idem<br>idem |
| (g) Surface active agent | L 5410 : 1 | idem | idem | idem |
| (e) Catalyst | Pb dibutyldithiocarbamate : 1<br>Na ethoxyde : 1 | Pb ricinoleate : 1,5<br>DBO : 0,8 | Pb octoate : 0,8<br>propylamine : 1,5 | Pb acetylacetonate : 1<br>1,4-butanediamine : 1 |
| (f) Antioxidant | TTP : 3<br>TOP : 2<br>UV Absorb. : 0,3 | idem<br>idem | idem<br>idem | idem<br>idem |
| (2) Reaction characteristics | | | | |
| (a) free RG | 68 | 69 | 69 | 77 |
| (b) CRT | 12" | 16" | 16" | 15" |
| (c) RT and TFT | 55" | 60" | 52" | 48" |
| (3) Properties of the moulded product. | | | | |
| (a) RG m. | 226 | 254 | 251 | 236 |
| (f) E-mod. | 4210 | 4420 | 4370 | 4320 |
| (b) HDT° C. | 82 | 91 | 81 | 90 |
| (e) Xenon test | >scale 8 | idem | idem | idem |

| Example No. | 31 | 32 | 33 | 34 |
|---|---|---|---|---|
| (1) Ingredient. | | | | |
| (a) + (d)Polyol + cross-linking agent | idem | idem | idem | idem |
| (b) Isocyanate | idem | idem | idem | idem |
| NCO index | idem | idem | idem | idem |
| (c) Swelling agent | idem<br>idem | idem<br>idem | idem<br>idem | idem<br>idem |
| (g) Surface active agent | idem | idem | idem | idem |
| (e) Catalyst | TMG : 1,5<br>disodium adipate : 1,5 | KAC : 0,5<br>Pb Pb stearate : 1 | KAC : 1<br>DABCO : 1 | Pb ricinoleate : 2<br>DABCO : 1 |

-continued

| | | HOBG : 0,5 | DBTL : 0.2 | DBTL : 0,2 |
|---|---|---|---|---|
| (f) Antioxidant | idem | idem | idem | idem |
| 2) Reaction characteristics | | | | |
| (a) free RG | 72 | S : — | — | — |
| (b) CRT | 16" | 11" | — | — |
| (c) RT and TFT | 58" | 49" | — | — |
| (3) Properties of the moulded product. | | | | |
| (a) RG m. | 259 | 260 | — | — |
| (f) E-mod. | 4400 | 4530 | — | — |
| (h) HDT HDI° C. | 98 | 86 | — | — |
| (e) Xenon test | idem | idem | — | — |

| Example No. | 35 | 36 | 37 | 38 |
|---|---|---|---|---|
| (1) Ingredient. | | | | |
| (a) Polyol(+ cross- + linking agent) | G 2410 S 60<br>Napiol R 103 : 10 | idem | idem | idem |
| (d) CP 1000 : 30 | | | | |
| (b) Isocyanate | 50% IPDI<br>50% XDI } 76 | idem | idem | idem |
| NCO index | 105 | idem | idem | idem |
| (c) Swelling agent | water : 0,3<br>Freon : 5 | idem<br>idem | idem<br>idem | idem<br>idem |
| (g) Surface active agent | DC 193 : 0,5 | | | |
| (e) Catalyst | Pb acetate : 1<br>ethylene-diamine : 1,5<br>DBTL : 0,50 | Pb naphthenate : 1<br>N-ethylbenzyl-<br>amine : 1 | Pb tartarate : 1<br>Disodium salicy-<br>late : 2 | Pb citrate : 1,5<br>diisopropanol-<br>amine : 2<br>DABCO : 0,3 |
| (f) Antioxidant | TPP : 3<br>TOP :2<br>UV absorb : 0,3<br>TCP : 5 | idem | idem | idem |
| 2) | | | | |
| (2) Reaction characteristics | | | | |
| (a) free RG | 164 | 155 | 160 | 148 |
| (b) CRT | 17" | 13" | 14" | 13" |
| (c) RT and TFT | 56" | 50" | 57" | 49" |
| (3) Properties of moulded product | | | | |
| (a) RG | 636 | 608 | 653 | 584 |
| (f) E-mod. | 9700 | 8850 | 11200 | 8800 |
| (g) HDT° C. | 96 | 106 | 101 | 95 |
| (c) RR | 205 | 198 | 218 | 200 |
| (b) ER | 25 | 21 | 20 | 22 |
| (i) Shore D | 74 | 68 | 66 | 65 |
| (e) Xenon test | scale 8 | idem | idem | idem |

| Example No. | 39 | 40 | 41 | 42 | 43 |
|---|---|---|---|---|---|
| (1) Ingredient | | | | | |
| (a) Polyol (+ cross- + linking agent) | idem | idem | idem | idem | idem |
| (d) | | | | | |
| (b) Isocyanate | idem | idem | Prep.IPDI-DPG<br>(30% NCO) : 118 | 50% IPDI<br>50% XDI } 76 | 50% IPDI<br>50% XDI } 76 |
| NCO index | idem | idem | idem | idem | idem |
| (c) Swelling agent | idem<br>idem | idem<br>idem | idem<br>idem | idem<br>idem | idem<br>idem |
| (3) Surface active agent | | | | | |
| (e) Catalyst | Pb oleate : 1<br>DBC oleate : 1 | TMG : 1,5<br>Na acetate: 1,5 | Pb tetraethyle 1<br>HMDA : 5 | DABCO : 1<br>DBTL : 0,2<br>diisopropanol-<br>amine : 3 | TMG : 3<br>DABCO : 1 |
| (f) Antioxidant | idem | idem | idem | idem | idem |
| (2) Reaction characteristics | | | | | |
| (a) free RG | 155 | 139 | 189 | — | — |
| (b) CRT | 18" | 16" | 17" | — | — |
| (c) RT and TFT | 55" | 55" | 60" | — | — |
| (3) Properties of moulded product | | | | | |
| (a) RG | 588 | 603 | 625 | — | — |
| (f) E-mod. | 9100 | 10050 | 6900 | — | — |
| (g) HDT° C. | 92 | 102 | 98 | — | — |

-continued

|     |         |     |     |     |   |   |
|-----|---------|-----|-----|-----|---|---|
| (c) | RR      | 194 | 206 | 190 | — | — |
| (b) | ER      | 18  | 19  | 15  | — | — |
| (i) | Shore D | 69  | 72  | 71  | — | — |
| (e) | Xenon Test | idem | idem | idem | — | — |

| Example No. | 44 | 45 | 46 |
|---|---|---|---|
| (1) Ingredient | | | |
| (a) Polyol | D 3900 : 100 | D 3900 : 100 | D 3900 : 100 |
| (b) Isocyanate | Hylene W : 62 | Hylene W : 62 | Hylene W : 62 |
| NCO index | 100 | idem : | idem : |
| (d) Cross-linking agent | BD : 12<br>DPG : 5<br>bis(hydroxyethyl)aniline : 5 | BD : 12<br>DPG : 3 | BD : 12<br>DPG : 5<br>bis(hydroxyethyl)aniline : 5 |
| (e) Catalyst | Pb octoate : 08<br>diethylamine : 1,5 | Pb dimethyldithiocarbamate : 1,5<br>diethanolamine : 5 | Pb laurate : 1<br>Na pentachlorophenolate : 1 |
| (f) Antioxidant | TPP : 3<br>TOP : 2<br>UV Absorb. : 0,3 | idem | idem |
| (2) Reaction characteristics | | | |
| PL | 36" | 42" | 41" |
| (3) Properties of moulded product | | | |
| (b) ER | 487 | 461 | 456 |
| (c) RR | 161 | 177 | 154 |
| (i) Shore A | 94 | 92 | 94 |
| (e) Xenon test | scale 8 | idem | idem |

| Example No. | 47 | 48 | 49 |
|---|---|---|---|
| (1) Ingredient | | | |
| (a) Polyol | D 2100 : 100 | D 2100 : 100 | D 3900 |
| (b) Isocyanate | Hylene W : 62 | Prep.Hylene W : DPG (25% NCO) : 79 | Hylene W : 62 |
| NCO index | idem | idem | idem |
| (d) Cross-linking agent | idem | idem | idem |
| (e) Catalyst | Pb acetate : 1<br>HDBG : 1 | DBU phenolate : 1<br>Na octoate : 2 | DABCO : 0,5<br>SO : 0,3<br>Pb acetate : 1 |
| (f) Antioxidant | idem | idem | idem |
| (2) 99 Reaction characteristics | | | |
| PL | 25" | 38" | > 10 min. |
| (3) Properties of moulded product | | | |
| (b) ER | 498 | 505 | — |
| (c) RR | 185 | 208 | — |
| (i) Shore | 97 | 99 | — |
| (e) Xenon test | idem | idem | — |

| Example No. | 50 | 51 | 52 |
|---|---|---|---|
| (1) Ingredient | | | |
| (a) Polyol | CP 260 : 45<br>P 1010 : 45<br>diethylene glycol : 10 | idem | idem |
| (b) Isocyanate | IPDI : 88 | idem | idem |
| NCO index | 105 | idem | idem |
| (c) Catalyst | Pb naphthenate : 0,8)<br>DBN acetate : 1,5 | Pb 2-ethylhexoate : 0,5<br>benzylamine : 2<br>idem | Pb diamyldithiocarbamate : 1,5<br>K phenolate : 0,5<br>SO : 0,2 |
| (f) Antioxidant | TPP : 5<br>TOP : 5<br>UV Absorb. : 0,3 | idem<br>idem<br>idem | idem<br>idem<br>idem |
| (2) Reaction characteristics | | | |
| PL | 13" | 10" | 7" |
| (3) Properties of moulded product | | | |
| (b) ER | 17 | 11 | 17 |
| (f) E-mod. | 17150 | 15080 | 15550 |
| (i) Shore D | 81 | 86 | 81 |
| (h) Res. | 0,85 | 0,90 | 0,85 |
| (g) HDT | 106 | 110 | 94 |
| (e) Xenon test | > scale 8 | idem | idem |

| Example No. | 53 | 54 | 55 |
|---|---|---|---|
| Ingredient | | | |
| (a) Polyol | idem | idem<br>Prep.IPDP-CP 260 | idem<br>IPDI : 88 |
| (b) Isocyanate | idem | (25% NCO) : 127 | |

|  |  |  |  |
|---|---|---|---|
| NCO index | idem | 100 | 105 |
| (c) Catalyst | PMG : 1<br>Na benzoate : 2 | Pb adipate : 1<br>N-aminoethylethano-<br>lamine : 1 | DABCO : 0,5<br>SO : 0,3<br>Na phenolate: 0,5 |
| (f) Antioxidant | idem | idem | idem |
| (2) Reaction charac-<br>teristics |  |  |  |
| PL | 11″ | 14″ | > 5 min. |
| (3) Properties of<br>moulded product |  |  |  |
| (b) ER | 18 | 21 | — |
| (f) E-mod. | 14900 | 19200 | — |
| (i) Shore | 85 | 90 | — |
| (b) Res. | 1,05 | 0,90 | — |
| (g) HDT | 99 | 105 | — |
| (e) Xenon test | idem | idem | — |

Information on signs, names and abbreviations used in the Tables (1) Ingredients (a) polyols CP 4800: reactive polyether triol with a hydroxyl index or number of about 35, known under the commercial designation "Voranol CP 4800" of Dow Chemical.

D 3900: reaction polyether triol with hydroxyl index of about 35, known under the commercial designation "Desmophene 3900" of Bayer.

Caradol 36-1: commercial designation of reactive polyether triol with hydroxyl index of about 35 of Shell.

D 2100: linear polyester diol having a molecular weight of about 2000 and a hydroxyl index of about 55, known under the commercial designation "Desmophene 2100" of Bayer.

F 50: slightly cross-linked polyester polyol with a hydroxyl index of about 50 and known under the commercial designation "Fomrez 50" of the firm Witco.

Scuranol 4004: commercial designation of a linear polyester diol having a molecular weight of about 2000 and a hydroxyl index of about 55 of RhonePoulenc–Sodethane.

Z800: sorbitol-based polyether hexol, with a hydroxyl index of about 420, known under the commercial designation "Napiol Z 800" of Rhone-Poulenc Sodethane.

G 2410 S: sorbitol-based polyether hexol with a hydroxyl index of about 490 of Atlas - ICI.

Napriol R 103: commercial designation of a cross-linking agent of amine-based polyether polyol with a hydroxyl index of about 480 of Rhone-Poulenc CP 1000: polyether triol with a molecular weight of about 1000 and a hydroxyl index of about 170, known under the commercial designation "Voranol CP 1000" of Dow Chemical.

CP 260: polyether triol (glycerin-propylene oxide) with a hydroxyl index of about 660, known under the commercial designation "Voranol CP 260" of Dow Chemical.

P 1010: polypropylene oxide-diol with a molecular weight of about 1000 and a hydroxyl index of about 110.

(b) Polyisocyanates

Hylene W: commercial name of a Du Pont de Nemours product, comprising a stereoisomer of 4,4′-methylenbis (cyclohexylisocyanate) containing 32% of NCO groups.

IPDI: commercial designation of 3-isocyanatomethyl-3,5,5-trimethylisocyanate containing about 37.8% of NCO groups of Veba Chemic Germany.

TMDI: 2,2,4-trimethyl hexamethylene diisocyanate containing 40% of NCO groups.

XDI: commercial designation of xylylene dissocyanate comprised of a mixture of 70% of metal-isomer and 30% of para-isomer, this mixture having a content of 45% of NCO groups.

Prep.IPDI and DIPA (25% NCO): prepolymer with terminal isocyanate groups obtained from 100 gr IPDI + 10.8 gr. of diisopropanolamine (DIPA).

Prep. IPDI -glycerin (30% NCO): prepolymer with terminal isocyanate groups, obtained from 100 gr of IPDI + 4.8 gr of glycerin.

Prep. IPDI-DPG (25% NCO): prepolymer with terminal isocyanate groups, obtained from 100 gr of IPDI + 8.5 gr of DPG.

Prep.Hylene W-DPG (25% NCO): prepolymer with terminal isocyanate groups, obtained from 100 gr of Hylene W and 7.9 gr of DPG.

Prep.IPDI-CP 260 (25% NCO): prepolymer with terminal isocyanate groups, obtained from 100 gr of IPDI + 17 gr of CP 260. These prepolymers were prepared by stirring both components at a temperature of about 80° C. for about 4 hours until the content of NCO groups is constant.

(c) Swelling agents.

water: (chemical agent allowing $CO_2$ to be formed)
Freon: trichlorofluoromethane
MC: methylene chloride (d) Crosslinkers-Chain extenders.

di EG: diethylene glycol
Quadrol: commercial name of the firm Jefferson for N,N′-tetrahydroxy- isopropylethylene-diamine with hydroxyl number of about 770.
DEOA: diethanolamine.
BD: 1,4-butanediol.
TEOA: triethanolamine
TMP: trimethylolpropane
EG: ethylene glycol
DIPA: diisopropanolamine
DPG: dipropylene glycol (e) Catalysts.

BDU: 1,8-diazabicyclo-(5,4,0)undecene-7
TMG: tetramethylguanidine
DBN: 1,5-diazabicyclo-(4,3,0)nonene-5
TMGC: cyclohexyltetramethylguanidine
PMG: pentamethylguanidine DBC: 1,5-diazabicyclo(4,4,0)decene-5
TMGD: n-decyltetramethylguanidine
DBO: 1,4-diazabicyclo(3,3,0)octene-4
HOBG: hexamethylene-octamethyl-biguanidine
DABCO: triethylene-diamine (Houdry)
DBTL: stannous dibutyl dilaurate
SO: stannous octoate
DBTA: stannous dibutyl diacetate
KAC: K acetate
HMDA: 1,6-hexamethylene-diamine
(f) Antioxidants.
TPP: triphenyl phosphite
TOP: trioctyl phosphite
PDDP: phenyldiisodecyl phosphite
TRIS: tris(dipropylene glycol) phosphite
TCP: tris (2-chloroethyl)-phosphate
UV Absorbent: 2-hydroxy-4-octoxybenzophenone known under commercial name "Cyasorb UV 531" of American Cyanamid.
(g) Surface active agents.
L 5305: polyoxyalkylene-polysiloxane copolymer of Union Carbide.
L 5410: polyoxyalkylene-polysiloxane copolymer of Union Carbide
DC 193: polyalkylene-polysiloxane copolymer of Dow Corning
2. Reaction characteristics.
These characteristics were determined in an open mould.
  (a) Free RG: foam density in Kg/m3 during free creaming and rise, namely in open mould.
  (b) CRT: cream time in seconds
  (c) RT: rise time in seconds
  (d) TFT: tack free time, namely time after which a foam does not tack anymore during a free creaming. This time corresponds to the rise time in the given Examples, namely the time which is necessary in order that the foam reaches its maximum volume.
  (e) PL: pot life.
  (f) Free 40% CDL: compression load deflection under 40% of compression, in gr/cm2, according to ISO/DIS 3386 specification on a sample formed with free foaming.
3. Properties of obtained moulded products.
  (a) RG m: average overall density in kg/m3 after foaming in closed mould.
  (b) ER: elongation at break in % according to NFT 56108 specification in Examples 1 to 26 and according to DIN 53 455 455 specification in Examples 35 to 55.
  (c) RR: Tensile strength in kg/cm2 according to NFT 56 108 specification in Examples 1 to 26 according to DIN 53 455 specification in Examples 35 to 55.
  (d)TR: Tear resistance in kg/cm according to ASTM 624-54C specification
  (e) Xenon test: ("scale x"): blue scale according to DIN 50004 specification according to which a superficial degradation start of the samples is recorded.
    scale 5: corresponds to a test duration of about 160 hours
    scale 6: corresponds to a test duration of about 260 hours
    scale 7: corresponds to a test duration of about 320 hours
    scale 8: corresponds to a test duration of about 550 hours.
    As radiation source, a Xenon lamp was used in a test room having a temperature of about 30° C. and a relative humidity of about 70%, while the sample temperature was about 45° C.
  (f) E-mod.: elasticity coefficient in kg/cm2 according to DIN 53 423 specification.
  (g) HDT: heat distortion temperature, namely plastification - deformation temperature in ° C. according to DIN 53 424 specification.
  (h) Res.: resilience, namely impact strength which is measured according to Izod Test (Izod impact strength) according to ASTM D 212 specification, in foot-pound/inch of notch.
  (i) Shore: normalized hardness measure.

It is to be noted that the term "idem" used in the tables means that these are the same data as the corresponding data of the preceding example.

Examples 10 to 55 such as grouped in the preceding tables, were carried out with an injection machine of the "Hennecke HK 100" type (high pressure), while examples 1 to 9 were carried out by means of an injection machine of the "Seamer 2000" type (low pressure).

In Examples 1 to 28 and 27 to 34, the so-called casting technique was used, in which the mixture of above-mentioned ingredients is poured into an open mould which is then closed.

In Examples 19 to 26 and 35 to 55, the so-called RIM technique was used, in which the mixing chamber of the injection machine is integral with the mould which remains closed when the mixture of ingredients is poured therein, injection being made under pressure in this case.

In each Example, one prepares a distinct sample of the ingredient mixture to which a free creaming is applied in order to be able to determine the reaction characteristics, such as rise time, free density (RG), creaming time and the like, such as mentioned in the tables.

In Examples 1 to 26 and 44 to 49, a mould was used the internal sizes of which were as follows: $20 \times 20 \times 0.6$ cm, while in Examples 27 to 43 and 50 to 55 a mould having internal sizes $50 \rightarrow 50 \times 1$ cm as used. So plates of 6mm and 10 mm in thickness were obtained respectively, and properties mentioned in the tables were examined on said plates.

The mould temperature was about 45° C. in Examples 1 to 34, while the mould was heated to 60° C. in Examples 35 to 55.

In all the Examples, the mould used was in cast aluminium.

In Examples 1 to 43, when the polyol used was polyether polyol, the latter was brought up to a temperature of about 30° C., while when it was a polyester polyol, its temperature was about 40° C. The isocyanate temperature was about 25° C. in these latter Examples.

With regard to Examples 44 to 55, the polyol temperature was 45° C. and that of polyisocyanate was about 40° C.

In Examples 8, 9, 17, 18, 26, 33, 42, 43 and 55 use was made by way of comparison of catalysts which are not within the scope of this invention. As it results from the tables, these catalysts did not lead to a valuable polyurethane so that the following conditions relating to reaction characteristics and properties of finished products do not apply to said Examples.

In Examples 1 to 43, except in Examples with a catalyst which is not within the scope of this invention, a film of skin of about 1 mm in thickness envelopping a core with a microcellular structure was obtained while in Examples 44 to 55, said core was formed of non cellular elastomer. In Examples 14, 15, 16 and 25 wherein a polyester polyol was used and the swelling agent is essentially water, a microcellular skin was formed, which was not the case in other Examples wherein a skin of non-cellular elastomer was obtained.

The time between injection into the mould and withdrawal of the formed article from the mould was about 6 minutes in Examples 1 to 7 and 27 to 41, of about 3 to 4 minutes in Examples 10 to 26, and of about 1 to 2 minutes in Examples 19 to 25 and 44 to 54, except in Examples 33 and 34.

In short, in Examples 1 to 7, a flexible microcellular product was obtained the final average density of which was about 250 kg/m3, which more particularly finds an application in the furniture and transport industries, for example as cushions, elbow-rests, saddles and the like.

In Examples 20 to 26, a semi-flexible microcellular product with an average final density of about 550 kg/m3 was obtained, which more particularly finds its use in shoe industry, as soles for example.

In Examples 19 to 25, a semi-rigid microcellular product of an average final density of about 900 kg/m3 was obtained, which more particularly finds its use in the security fittings due to its damping properties, for example as shock-absorbers, instrument-boards and the like.

In Examples 27 to 32, a rigid microcellular product with an average final density of about 250 kg/m3 was obtained, while in Examples 35 to 41, a substantially similar product was obtained the average final density of which was however of about 600 kg/m3.

Typical applications of rigid polyurethanes of low density are in the field of wood decoration imitation where no functional effect is necessary, while typical applications of rigid polyurethan with high density are on the contrary in the decorative field wherein moreover some functional effect is wished. This if for example the case in the furniture field and in the electronic field.

In Examples 44 to 49, a semi-flexible elastomer product having a final density of about 1200 kg/m3 was obtained, and in examples 50 to 54, a rigid elastomer product (solid urethane plastic) with a final density of about 1200 kg/m3 was obtained.

With regard to the Xenon test carried out on samples obtained from the various examples, it has been found that a discoloration was produced in none of these samples.

The fact that the pot life is rather important in some examples is a measure of the low reactivity of the reaction composition.

We claim:

1. An improved process for preparing polyurethane wth integral skin, wherein a composition comprising the following ingredients: polyol, polyisocyanate, at most one part by weight of water to 100 parts by weight of polyol and catalyst, is reacted in a mould so that said polyurethane is formed, wherein the improvement comprises using a polyisocyanate the NCO groups of which are not directly bonded to an aromatic group and, as catalyst, at least one of the following four synergistic combinations:

(1) at least an amine containing the structure:

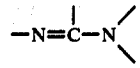

in association with at least an alkali metal or alkaline-earth metal salt, alcoholate and/or phenolate of an acid whose dissociation is constant $Ka \leq 10^{-1}$, preferably $Ka \leq 10^{-2}$ (2) at least an organic lead compound in association with at least an organic initiator comprising at least one functional group of primary or secondary amine;

(3) at least an organic lead compound in association with at least an amine containing the structure:

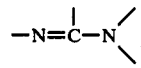

or, (4) at least an organic lead compound in association with at least an alkali metal or alkaline-earth metal salt, alcoholate and/or phenolate of an acid the dissociation constant of which is $Ka \leq 10^{-1}$ preferably $Ka \leq 10^{-2}$.

2. A process as claimed in claim 1, which comprises using as the amine of the structure

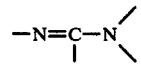

in said catalyst, at least one compound selected from the group consisting of:

(1) diazabicycloalkenes of the formula:

wherein m varies from 3 to 7 and n from 2 to 4, and its salts with organic acids whose dissociation constant is $Ka 10^{-2}$ (2) substituted guanidines and salts thereof of the formula:

wherein $R_1$, $R_2$, $R_3$ and $R_4$ independently represent an alkyl ($C_1$–$C_4$) radical, an alkyl ($C_1$–$C_4$) radical substituted by an alkoxy ($C_1$–$C_4$) radical, or a heterocyclic radical ($C_5$–$C_7$) containing at most two atoms selected from the group consisting of sulfur and oxygen, $R_1$–$R_2$ and/or $R_3$–$R_4$ being able to form with the adjacent nitrogen atom, a heterocyclic ($C_5$–$C_7$) ring containing at most a sulfur or oxygen atom, X represents hydrogen, a phenyl group, a phenyl group substituted by one or more alkoxy ($C_1$-$C_4$) radicals, alkyl ($C_1$-$C_{12}$) radicals, or halogens, or represents a radical of the formula:

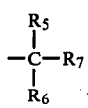 (III)

wherein $R_5$, $R_6$ and $R_7$ independently represent hydrogen, an alkyl ($C_1$-$C_4$) radical oran alkyl ($C_1$-$C_4$) radical substituted by phenyl, substituted phenyl, alkoxy ($C_1$-$C_4$), aryloxy ($C_6$-$C_{15}$), nitrile, carbalkoxy, $R_7$ may represent an alkyl ($C_5$-$C_{18}$) radical, a substituted phenyl radical or an alkoxy ($C_1$-$C_4$) radical, or one or both of the groups $R_5$-$R_6$, $R_5$-$R_7$ and $R_6$-$R_7$ form a cyclic ring of carbon atoms with at most a nitrogen, sulfur or oxygen atoms, X may be a radical of the formula:

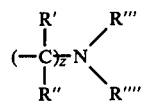 (IV)

wherein z is an integer varying from 2 to 12, R' and R" representing hydrogen or an alkyl ($C_1$-$C_4$) radical, R''' and R'''' represent an alkyl ($C_1$-$C_4$) radical or form with nitrogen a cycloalkyl ($C_5$-$C_6$) radical, as well as addition salts of said guanidines, and salts of guanidines wherein at least one of $R_1$, $R_2$, $R_3$ and $R_4$ is hydrogen, with an acid having a dissociation constant $Ka \leq 10^{-3}$;

(3) substituted biguanidines of the formula:

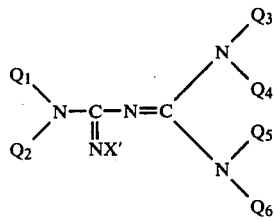 (V)

wherein $Q_1$ to $Q_6$ independently represent an alkyl ($C_1$-$C_4$) radical or a cycloalkyl ($C_3$-$C_4$) radical, and X' is hydrogen or a carbamoyl radical of the formula:

 (VI)

wherein Z is a monovalent radical remaining after elimination of a isocyanate group of the above-mentioned polyisocyanate, $Q_1$ to $Q_6$, X' and Z may optionally be substituted by chlorine, bromine or alkoxy ($C_1$ or $C_2$);

(4) substituted biguanidines of the formula:

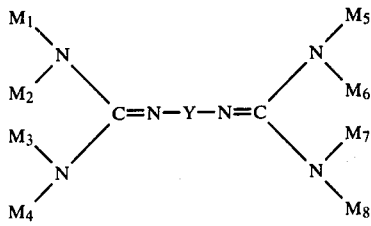

wherein $M_1$ to $M_8$ independently represent an alkyl ($C_1$-$C_4$) radical, Y is a group:

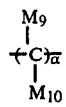 (VIII)

wherein $M_9$ and $M_{10}$ represent hydrogen or an alkyl ($C_1$-$C_4$) radical, and α is an integer varying from 3 to 12, or represents a divalent cyclohexyl radical, or a divalent isophorone radical.

3. A process as claimed in claim 2, which comprises using as the amine of the structure:

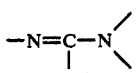

in the above-mentioned catalyst, at least one of the compounds selected from the group consisting of:

(1) following diazabicycloalkenes:
1,5-diazabicyclo(4,3,0)nonene-5,
1,8-diazabicyclo(5,4,0)undecene-7,
1,8-diazabicyclo(5,3,0)decene-7,
1,5-diazabicyclo(5,4,0)decene-5,
1,4-diazabicyclo(3,3,0)octene-4, salts of addition of said diazabicycloalkenes with mono- or dicarboxylic acids having a dissociation constant $Ka \leq 10^{-4}$, with carbonic acid and with phenols, (2) substituted guanidines of the formula:

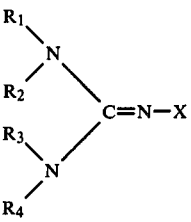 (II)

wherein X represents hydrogen, a methyl, cyclohexyl, decyl, dodecyl, alkylphenyl ($C_1$-$C_4$) radical or a radical of the formula:

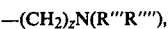

in which z is equal to 2 or 3, and R''' and R'''' are identical or different and represent an alkyl ($C_1$-$C_4$) radical, $R_1$ to $R_4$ being identical or different and represent a methyl radical of hydrogen, as well as salts of addition of said guanidines and salts of guanidines of the above formula, wherein moreover at least $R_1$ and $R_2$ are hydrogen, with carbonic acid and phenol, (3) 1,1,4,4,5,5,-hexamethylisobiguanidine, and
(4) substituted biguanidines of the formula:

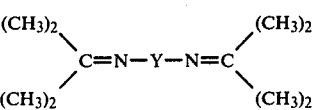

in which Y is a divalent alkylene ($C_6$-$C_{12}$) radical.

4. A process as claimed in claim 1, which comprises using in the catalyst, in combination with said amine of the structure

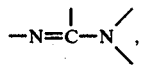

a salt of an alkali metal salt of an alkali metal selected from the group consisting of salts of sodium and potassium of oleic, 2,3-methylbenzoic, adipic, 2,4-dichlorobenzoic, benzoic, β-chloroacetic, chloro- and bromobenzoic, salicylic, acetic, formic acid, and sodium and potassium phenolates and sodium and potassium methoxides.

5. A process as claimed in claim 1, which comprises using in said catalyst, as the organic lead compound, a compound selected from the group consisting of:
 (a) divalent lead organic salts of carboxylic acids containing at least a COOH group,
 (b) lead dithiocarbamates of the formula:

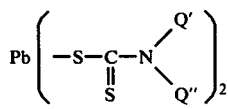

wherein Q' and Q'' are identical or different and represent an alkyl ($C_1$–$C_{20}$) radical,
 (c) tetravelent organic lead compounds of the formula $PbQ_4'''$, wherein Q''' is an alkyl ($C_1$–$C_6$) radical, and
 (d) divalent lead acetylacetonate.

6. A process as claimed in claim 5, which comprises using (a) as the divalent organic lead salt of carboxylic acid, a compound selected from the group consisting of lead acetate, adipate, citrate, 2-ethylheroate, laurate, linoleate, naphthenate, octanoate, oleate, oxalate, palmitate, resinate, ricinoleate, salicylate, stearate, tallate, and tartrate; (b) as the dithiocarbamate of the above cited formula, and compound wherein Q' and Q'' are a methyl, ethyl, butyl or amyl radical and (c) as the organic compound of formula $PbQ_4'''$, a compound in which Q''' is a methyl or ethyl radical.

7. A process as claimed in claim 1, which comprises using as organic initiator, at least a compound selected from the group consisting of ethylamine, butylamine, hexylamine, laurylamine, octylamine, propylamine, pentylamine, heptylamine, nonylamine, decylamine, undecylamine, heptadecylamine, oleylamine, benzylamine, allylamine, N-2-aminoethylmorpholine, N-3-aminopropylmorpholine, cyclohexylamine, 2(3,4)-chlorobenzylamine, 1,3-dimethylbutylamine, 2,5-dimethylbenzylamine, o-(m,p)-methoxybenzylamine, 3N-dimethyl(diethyl)amino-1,3-propanediamine,2-amino-5N-diethylaminopenetane, N(3-aminopropyl)-2-pyrrolidone, diethylamine, di(iso)propylamine, dibutylamine, dioctylamine, dihexylamine, dinonylamine, dicyclohexylamine, N-methyl-octadecylamine, N-ethyl-and-N propylbenzylamine, pyrazole, pyrrole, pyrrolidine, piperidine, morpholine, 2-(2-hydroxyethyl)-piperidine, bis(2-chloroethyl)amine, N,N-bis(2,2-diethoxyethyl)amine, 1,2-diaminopropane, 1,3-diaminopropane, ethylenediamine, 1,4-diaminobutane, 1,5-diaminopentane, 1,6-diaminohexane 1,10-diaminodecane, 1,12-diaminododecane, isophorondiamine, 2,2,4-trimethylhexamethylene-diamine, $NH_2CH(CH_3)CH_2[OCH_2CH(CH_3)]_xNH_2$ wherein x is selected from values substantially equal to 2.6, 5.6 or 15.9, 1,4-bis(aminopropyl)piperazine, N,N'-dimethyl-(diethyl)-ethylenediamine, 4,4'-trimethylene piperidine, 3-ethylamino-1-propylamine, 3-butylamino-1-propylamine, 3-ethylpropylamino-1-propylamine, N-alkyl-propylene diamines, N-alkyl-dipropylene-triamines, diethylenetriamine, triethylenetriamine, tetraethylenepentamine, pentaethylene hexamine, N-isopropyl-2-methyl-1,2-propanediamine, N-(2-aminoethyl)-piperazine, 1-(β-aminoethyl)-2-imidazolidone, 3,3'-imino-bispropylamine, bis(2-aminopropyl)-amine, bishexamethylene triamine, monoethanolamine, isopropanolamine, 3-amino-1-propanol, 3-amino-1,2-propanediol, 2-amino-2-methyl-1-propanol, 2-amino-2-methyl-1,3-propanediol, 2-amino-1-butanol, 6-amino-1-hexanol, 1,3-diamino-2-propanol, diethanolamine, dilsopropanolamine, 2-(2,2-aminoethylamino)ethylaminoethanol, N-aminoethylethanolamine, N,N'bis(2-hydroxyethyl)-1,2-diaminocyclohexane, N,N'hydroxyethyl-ethylenediamine, N(3-aminopropyl)-diethanolamine, tris(hydroxymethyl)-aminoethane and 2-(2-methanolamino)-ethylaminoethanol.

8. A process as claimed in claim 1, which comprises using as said organic initiator a compound containing at least two functional groups at least one of which is a primary or secondary amine.

9. A process as claimed in claim 1, which comprises using in the catalyst, 0.1 to 10 parts by weight of said amine of the structure

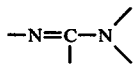

to 100 parts by weight of polyol.

10. A process as claimed in claim 9, which comprises using in the catalyst, 0.5 to 3 parts by weight of said amine to 100 parts by weight of polyol.

11. A process as claimed in claim 1 which comprises using in the catalyst, 0.05 to 5 parts by weight of alkali metal or alkaline-earth metal salt, alcoholate and phenolate to 100 parts by weight of polyol.

12. A process as claimed in claim 11, which comprises using 0.2 to 3 parts by weight of said salt, alcoholate and/or phenolate to 100 parts by weight of polyol.

13. A process as claimed in claim 1, which comprises using in the catalyst 0.1 to 10 parts by weight of said organic lead compound to 100 parts by weight of polyol.

14. A process as claimed in claim 13, which comprises using in the catalyst, 0.2 to 4 parts by weight of lead compound to 100 parts by weight of polyol.

15. A process as claimed in claim 1, which comprises using in the catalyst, 0.2 to 5 parts by weight of a monofunctional initiator to 100 parts by weight of polyol.

16. A process as claimed in claim 15, which comprises using in the catalyst, 0.2 to 3 parts by weight of a monofunctional initiator to 100 parts by weight of polyol.

17. A process as claimed in claim 8, which comprises using in the catalyst, 0.2 to 30 parts by weight of an initiator comprising at least two functional groups to 100 parts of polyol. 100

18. A process as claimed in claim 17, which comprises using in the catalyst, 0.2 to 10 parts by weight of an initiator comprising at least two functional groups to 100 parts by weight of polyol.

19. A process as claimed in claim 1, which comprises using a cross-linking agent.

20. A process as claimed in claim 19, which comprises using a cross-linking agent, except when the catalyst comprises more than 2 parts by weight, preferably more than 4 parts by weight, of an initiator comprising at least two functional groups.

21. A process as claimed in claim 1, which comprises using 2 to 30 parts by weight of a physical swelling agent, such as trichlorofluoromethane, methylene chloride or a mixture of both said products, to 100 parts by weight of polyol.

22. A process as claimed in claim 1, which comprises using at most 0.5 parts by weight of a chemical swelling agent, such as water, to 100 parts by weight of polyol.

23. A process as claimed in claim 1, wherein said polyisocyanate is an aliphatic or alicyclic polyisocyanate.

24. The process of claim 1, wherein said catalyst synergistic combination is said synergistic combination (1).

25. The process of claim 1, wherein said catalyst synergistic combination is said synergistic combination (2).

26. The process of claim 1, wherein said catalyst synergistic combination is said synergistic combination (3).

27. The process of claim 1, wherein said catalyst synergistic combination is said synergistic combination (4).

28. The process of claim 1, wherein said catalyst provides with said polyisocyanates a reactivity substantially identical to that obtained with aromatic polyisocyanates.

* * * * *